S. H. HUMMELL.
TRACTION WHEEL.
APPLICATION FILED APR. 15, 1911. RENEWED MAY 7, 1912.

1,039,747.

Patented Oct. 1, 1912.

WITNESSES

INVENTOR
S. H. HUMMELL.

UNITED STATES PATENT OFFICE.

SIDNEY HELDAR HUMMELL, OF CRANBROOK, BRITISH COLUMBIA, CANADA.

TRACTION-WHEEL.

1,039,747.  Specification of Letters Patent.  Patented Oct. 1, 1912.

Application filed April 15, 1911, Serial No. 621,389. Renewed May 7, 1912. Serial No. 695,785.

*To all whom it may concern:*

Be it known that I, SIDNEY HELDAR HUMMELL, of the town of Cranbrook, in the Province of British Columbia, Canada, have invented certain new and useful Improvements in Traction-Wheels, of which the following is the specification.

My invention relates to improvements in traction wheels and the object of the invention is to devise a wheel of this class which will be suitable for traveling over hard or soft ground and in winter weather over ice and snow.

The invention comprises the novel features of construction and arrangement and combination of parts hereinafter described and particularly defined in the appended claims.

An embodiment of the invention is illustrated in the accompanying drawing, in which—

Figure 1:
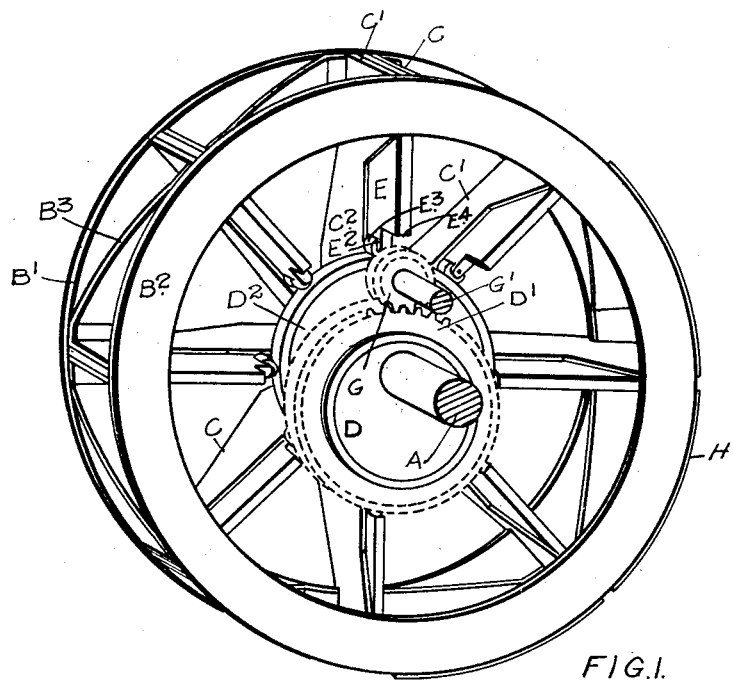
Figure 2:
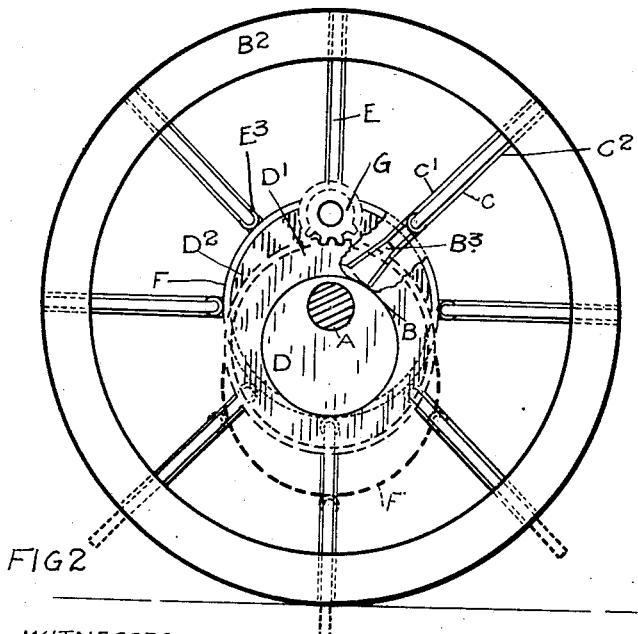
Figure 3:
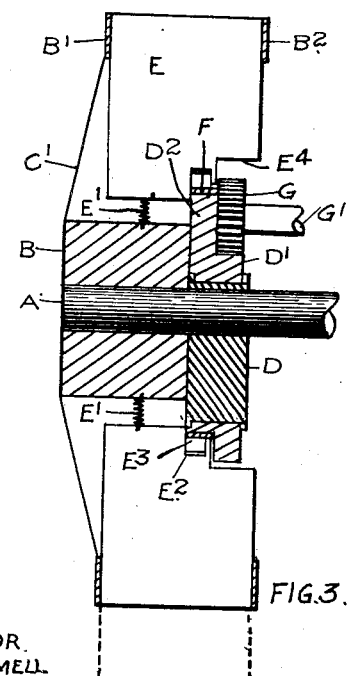

Figure 1, is a general perspective view of my wheel with some of the peripheral plates removed. Fig. 2, is a face view of the wheel. Fig. 3, is a vertical section through the center of the wheel.

In the drawings like letters of reference indicate corresponding parts in each figure.

A is the axle on which is suitably and rotatably mounted the traction wheel hub B.

B' and B² are annular face plates forming the periphery of the wheel.

Pairs of spaced plates C, C', extend radially outward from the hub, forming what may be termed hollow spokes C². At their outer end the plates C and C' are suitably secured between the plates B' and B².

B³ are bracing plates extending diagonally across the space between the spokes and between the face plates B' and B².

D is an eccentric disk secured to the axle.

D' is a gear wheel mounted on the disk D and concentric therewith.

D² is a supplemental disk secured to or forming part of the wheel D', such supplemental disk D² being normally concentric to the axle A.

E are a series of plates, a plate E being suitably held between each pair of plates C and C' forming the spokes C². The plates E are secured to the hub B by spiral tension springs E'. Each plate E is provided with a notch E² in which is preferably journaled a friction roller E³ and a supplemental notch E⁴ designed to prevent the plates contacting with the gear wheel D'.

F is a friction band encircling the supplemental disk D². It will be understood that the contacting surfaces between the band F and the disk D² are lubricated so as to prevent friction between the band and the disk.

G is a driving pinion mounted upon a suitable shaft G' which is operated by any suitable means, such as a lever mounted on the frame of the traction engine.

H is a series of peripheral plates which are suitably secured to the face plates B' and B² between the openings of the spoke C².

Having described the principal parts involved in my invention I will now briefly describe the operation of the same.

Under ordinary circumstances when the road is hard the wheel is used as shown with the outer ends of the plates E flush with the periphery of the wheel and the plates H extending all around the wheel between the spokes C². Should, however, the roads become soft or should it be desired to use the wheel on soft snow or adhesive mud all that it is necessary to do is to remove the plates H and rotate the wheels G and D' so as to carry the disk D² toward the position shown by dotted lines in Fig. 2. When the disk is in this position it will be readily seen that as the wheel rotates, the lowermost plates E will be forced into the position shown by dotted lines in Figs. 2 and 3 and into the mud or snow so as to grip on the hard ground beneath. It will also be seen that as the wheel continues to revolve, each plate as it comes up toward the top of the wheel is drawn into a hollow spoke which serves to strip the plates of mud or snow, which is liable to cling thereto also by removing the plates H from the periphery of the wheel as described a much better grip is provided. It will thus be seen that by the simple operation of the lever or other adjusting means operating the wheel G, the plates E may be set to extend to any required distance from the periphery of the wheel as they revolve. It will thus be seen that when the wheel is traveling over ice, the plates may be set so as to extend slightly beyond the periphery of the wheel to grip the surface of the ice.

From this description it will be seen that I have devised a very simple form of wheel of this class which will be suitable for use on rough, smooth, hard or soft ground, ice or snow, and in fact will be suitable for use under all conditions.

What I claim as my invention is,

1. A traction wheel comprising a hub, hollow spokes extending radially outward from the hub, annular face plates secured to each side of the spokes at their outer ends, bracing plates extending diagonally across the openings between the spokes and forming face plates, and radially movable members within said hollow spokes with means for projecting and retracting them as the wheel rotates, substantially as described.

2. A traction wheel comprising a hub, hollow spokes extending from the hub, annular face plates secured to each side of the spokes at their outer ends so as to form the periphery of the wheel, bracing plates extending diagonally across the openings between the spokes and between the face plates, spring held plates slidably held within the spokes, means for carrying them radially outwardly as they travel around the axle and toward the surface of the ground and radially inwardly as they revolve from the surface of the ground and peripheral segmental plates extending around the annular face plates between the hollow spokes and spaced apart to form an opening registering with the opening of the spokes, as and for the purpose specified.

Signed at the city of Vancouver, Province of British Columbia, Dominion of Canada, this 10th day of March, A. D., 1911.

SIDNEY HELDAR HUMMELL.

In the presence of—
FREDERICK G. T. LUCAS,
EDWARD A. LUCAS.

---

Copies of this patent may be obtained for five cents each, by addressing the "Commissioner of Patents, Washington, D. C."